(12) United States Patent
Mate (10) Patent No.: US 9,085,043 B2
(45) Date of Patent: Jul. 21, 2015

(54) SUBMERGED ARC WELDING SYSTEM WITH PRESSURIZED FLUX DELIVERY AND WELDING TORCH

(71) Applicant: Lincoln Global, Inc., City of Industry, CA (US)

(72) Inventor: David A. Mate, Thompson, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 0 days.

(21) Appl. No.: 14/523,036

(22) Filed: Oct. 24, 2014

(65) Prior Publication Data
US 2015/0041440 A1 Feb. 12, 2015

Related U.S. Application Data

(63) Continuation-in-part of application No. 14/017,615, filed on Sep. 4, 2013, now Pat. No. 8,916,792, which is a continuation of application No. 12/504,411, filed on Jul. 16, 2009, now Pat. No. 8,552,329.

(51) Int. Cl.
*B23K 9/32* (2006.01)
*B23K 9/18* (2006.01)

(52) U.S. Cl.
CPC .................. *B23K 9/324* (2013.01); *B23K 9/186* (2013.01)

(58) Field of Classification Search
CPC .............................. B23K 9/186; B23K 9/324
USPC ............................ 219/121.11–121.35, 72–76
See application file for complete search history.

(56) References Cited

U.S. PATENT DOCUMENTS

| | | | |
|---|---|---|---|
| 2,105,079 A | | 1/1938 | Holslag |
| 2,510,204 A | * | 6/1950 | Baird ........................ 219/73.2 |
| 2,934,632 A | | 4/1960 | Todd |
| 3,194,943 A | | 7/1965 | Flora |
| 3,676,640 A | | 7/1972 | Bernard |
| 4,221,957 A | | 9/1980 | Barger et al. |
| 4,242,007 A | | 12/1980 | Ogden et al. |
| 4,342,897 A | | 8/1982 | Murai et al. |
| 4,347,427 A | | 8/1982 | Gentilo et al. |
| 4,348,574 A | | 9/1982 | Barger et al. |

(Continued)

FOREIGN PATENT DOCUMENTS

| | | |
|---|---|---|
| JP | 58-100974 A | 6/1983 |
| WO | 2011/007245 A2 | 1/2011 |

OTHER PUBLICATIONS

Annex to Form PCT/ISA/206: Communication Relating to the Results of the Partial International Search; Corresponding PCT Application Serial No. PCT/182010/001739; Authorized Officer DUPONT-HUPER, Marie-Laure; Issued Dec. 1, 2010.

(Continued)

*Primary Examiner* — Kevin P Kerns
*Assistant Examiner* — Steven Ha
(74) *Attorney, Agent, or Firm* — Pearne & Gordon LLP (57) ABSTRACT

A submerged arc welding system includes a robot having a first arm connected to a second arm, and at least one wire supply. A welding torch is connected to a first end of the second arm of the robot. A wire motor is mounted to a second end of the second arm of the robot. The wire motor moves wire from the wire supply along a wire path to the welding torch. The system further includes a flux supply and a flux delivery system configured to move flux from the flux supply along a flux path to the welding torch.

14 Claims, 6 Drawing Sheets

(56) References Cited

U.S. PATENT DOCUMENTS

| | | |
|---|---|---|
| 4,455,222 A | 6/1984 | Less |
| 4,570,047 A | 2/1986 | Vislosky |
| 4,642,752 A | 2/1987 | Debarbieri et al. |
| 5,021,149 A | 6/1991 | Geisseler |
| 5,205,469 A | 4/1993 | Capitanescu |
| 5,536,913 A | 7/1996 | Weidner, Sr. et al. |
| 6,399,912 B1 | 6/2002 | Steenis et al. |
| 6,755,339 B2 | 6/2004 | Lamothe et al. |
| 2002/0079301 A1 | 6/2002 | Bong et al. |
| 2008/0149608 A1 | 6/2008 | Albrecht |
| 2011/0011835 A1 | 1/2011 | Mate |

OTHER PUBLICATIONS

International Search Report; Corresponding PCT Application Serial No. PCT/IB2010/001739; Authorized Officer Jeggy, Thierry; Issued Nov. 3, 2010.

Written Opinion; Corresponding PCt Application No. PCT/IB2010/001739; Authorized Officer Jeggy, Thierry; Issued Nov. 3, 2010.

International Search Report; Corresponding PCT Application Serial No. PCT/IB2010/001739; Authorized Officer Gruber, Ralp; Issued Nov. 16, 2011.

Written Opinion; Corresponding PCT Application Serial No. PCT/IB2010/001739; Authorized Officer Jeggy, Thierry; Issued Sep. 15, 2011.

Weld Engineering Co, Inc.: http://www.weldengineering.com/flux_pres_feed.htm; Submerged Arc Flux Recovery Pressure Feed Equipment (Jun. 14, 2009).

Weld Engineering Co, Inc.: http://www.weldengineering.com/std_duty.htm; Standard Duty Submerged Arc Flux Recovery Equipment (Jun. 14, 2009).

Weld Engineering Co, Inc., 34 Fruit St., Shrewsbury, MA 01545: Catlog-WE-PFR-3-398; The Revolutionary PFR-3 (Jun. 14, 2009).

Key Plant (www.key-plant.co.uk): Air Operated Flux Recovery System (Jun. 14, 2009).

Fanuc Robotics America Inc., 3900 W. Hamlin Road, Rochester Hills, MI48309-3253; ARC Mate 120iBe; (Jun. 14, 2009)

Spartan Scientific (www.spartanscientific.com): Angle Stream 2-Way Air Pilot Valves, Series APV-23 (Jun. 14, 2009).

Miller Electric Mfg. Co.: Submerged Arc Welding; pp. 1-28; (Rev. Nov. 1985).

* cited by examiner

SUBMERGED ARC WELDING SYSTEM WITH PRESSURIZED FLUX DELIVERY AND WELDING TORCH

CROSS REFERENCE TO RELATED APPLICATIONS

This application is a continuation-in-part of U.S. patent application Ser. No. 14/017,615 (now U.S. Pat. No. 8,916,792) filed in the United States Patent and Trademark Office on Sep. 4, 2013, which is a continuation of U.S. patent application Ser. No. 12/504,411 (now U.S. Pat. No. 8,552,329) filed in the United States Patent and Trademark Office on Jul. 16, 2009. The entirety of both of said applications is incorporated herein by reference.

FIELD OF INVENTION

The present application relates to a submerged arc welding system. More particularly, the present application relates to an automatic submerged arc welding system with a pressurized flux delivery system.

BACKGROUND

Submerged arc welding is a type of welding where the arc is completely submerged in a covering of granular fusible flux. The flux protects the molten weld puddle from atmospheric contamination. Submerged arc welding systems, like other types of welding systems, may include a welding power supply, a wire feed control and drive assembly and a welding torch. In addition, submerged arc welding systems also include a flux system. The flux system holds and delivers the flux to the weld joint during welding.

SUMMARY

A submerged arc welding system includes a robot having a first arm connected to a second arm, and at least one wire supply. A welding torch is connected to a first end of the second arm of the robot. A wire motor is mounted to a second end of the second arm of the robot. The wire motor moves wire from the wire supply along a wire path to the welding torch. The system further includes a flux supply and a flux delivery system configured to move flux from the flux supply along a flux path to the welding torch.

BRIEF DESCRIPTION OF THE DRAWINGS

In the accompanying drawings, structures are illustrated that, together with the detailed description provided below, describe exemplary embodiments of the claimed invention.

In the drawings and description that follows, like elements are identified with the same reference numerals. The drawings are not to scale and the proportion of certain elements may be exaggerated for the purpose of illustration.

DETAILED DESCRIPTION

Figure 1:
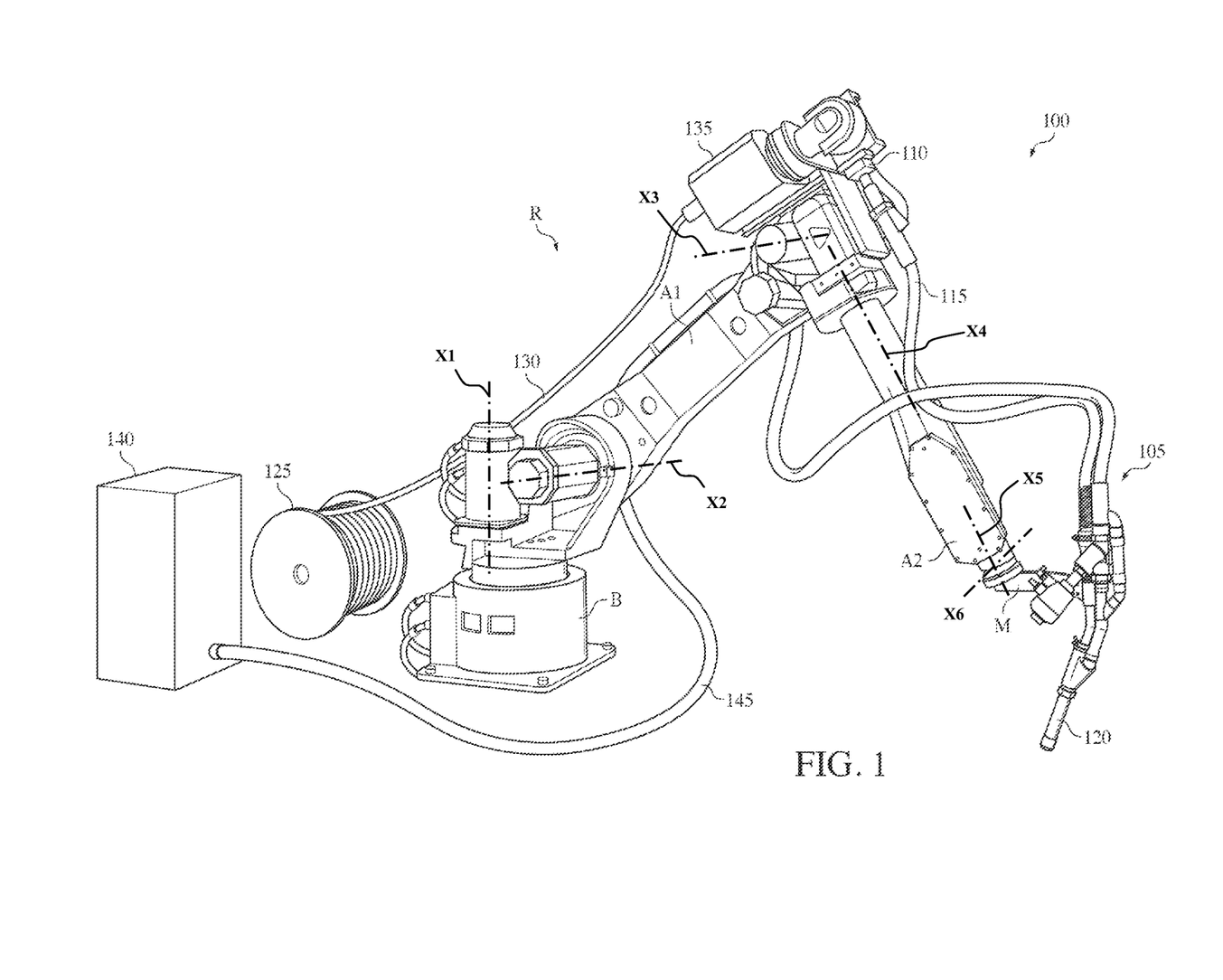
FIG. 1 is a perspective view of one embodiment of a submerged arc welding system attached to a robot.

FIG. 1 is a perspective view of a submerged arc welding system 100 used with a robot R. In the illustrated embodiment, the robot R has a base B, a first arm A1, and a second arm A2. The first arm A1 is rotatably connected to the base B and is configured to rotate about a first axis X1 and a second axis X2. The second arm A2 is rotatably connected to the first arm A1 and is configured to rotate about a third axis X3 and a fourth axis X4. In the illustrated embodiment, the robot R further includes a torch mounting bracket M, connected to the second arm A2, that articulates about a fifth axis X5 and sixth axis X6. In one known embodiment, the robot R is the ARC MATE 120iBe manufactured by FANUC ROBOTICS. However, it should be understood that the illustrated robot R is merely exemplary, and that the submerged arc welding system 100 may be employed with any robot or robotic arm.

In the illustrated embodiment, the submerged arc welding system 100 includes a welding torch 105 comprising a power block 110, a welding torch cable 115, and a nozzle 120. The welding torch cable 115 may include an optional liner. In an alternative embodiment (not shown), the welding torch includes a power block, a torch power connection, and a wire conduit and welding cables configured to handle required amperage connected to the power block. In one known embodiment, the welding torch 105 weighs less than 20 kilograms. The welding torch 105 is connected to the second arm A2 of the robot R by the torch mounting bracket M. In an alternative embodiment, the welding torch 105 is directly connected to the second arm A2.

A wire supply 125 supplies welding wire 130 to a wire motor 135, which feeds the welding wire 130 through the welding torch cable 115 of the welding torch 105 and subsequently through the nozzle 120. In other words, the wire motor 135 moves the welding wire 130 from the wire supply 125 along a wire path though the nozzle 120 of the welding torch 105, wherein the wire path includes the wire motor 135 and the welding torch cable 115. The wire supply 125 is shown as a single spool of welding wire, but it should be understood that the wire supply 125 may include two or more wire supplies, such as a first spool of welding wire and a second spool of welding wire. Where two or more wire supplies are employed, a corresponding number of wire motors and welding torch cables are employed. In other alternative embodiments (not shown), the wire supply 125 may take the form of a reel, spool, drum, or box container.

In the illustrated embodiment, the wire supply 125 is not directly mounted to the robot R. Instead, the wire supply 125 is located distal from the robot R. The wire supply 125 may be located any distance from the robot R, such that it may be placed in a position suitable for a particular environment. In most known welding environments, the wire supply 125 will be located between about 1 meter to about 50 meters from the robot R.

The wire motor 135 is shown mounted to the first arm A1 of the robot R, behind the third and fourth axes. In alternative embodiments (not shown), the wire motor 135 may be mounted to the second arm A2 of the robot R, or placed in a location not connected to the robot R.

Additionally, the submerged arc welding system 100 includes a flux supply 140 that supplies flux through a flux line 145 to the welding torch 105. The flux includes granular fusible flux particles. The flux particles may include lime, silica, manganese oxide, calcium fluoride, or a combination thereof. The flux may also include flux fines (i.e., small particles) and dust of the same or similar composition as the flux particles.

In one embodiment, the flux supply 140 includes a vacuum unit (not shown) having a hose extending adjacent the nozzle 120. The hose and vacuum unit are configured to use suction to collect flux particles that pass through the nozzle 120 and remain on a surface.

In one embodiment, the flux supply 140 includes a pressurized flux delivery system that employs pressurized air to push or otherwise move flux through the flux line 145, wherein the flux line 145 is directly connected to the welding torch 105. The flux supply 140 is shown as a feed tank, such as a pressurized feed tank. There is no intervening gravity hopper disposed between the flux supply 140 and the welding torch 105. In other words, the pressurized flux delivery system moves the flux along a flux path from the flux supply 140 to the nozzle 120 of the welding torch 105, wherein the flux path does not include a gravity hopper.

The flux supply 140 is not directly mounted to the robot R. Instead, the flux supply 140 is located distal from the robot R. The flux supply 140 may be located any distance from the robot R, such that it may be placed in a position suitable for a particular environment. In most known welding environments, the flux supply 140 will be located between about 1 meter to about 20 meters from the robot R.

The submerged arc welding system 100 may also include a flux recycling system (not shown) for recycling flux that is discharged through the nozzle 120. The flux recycling system may include one or more vacuum tubes that lead back to the flux supply 140 or to the flux line 145, thereby allowing discharged flux to be reused.

Figure 2:
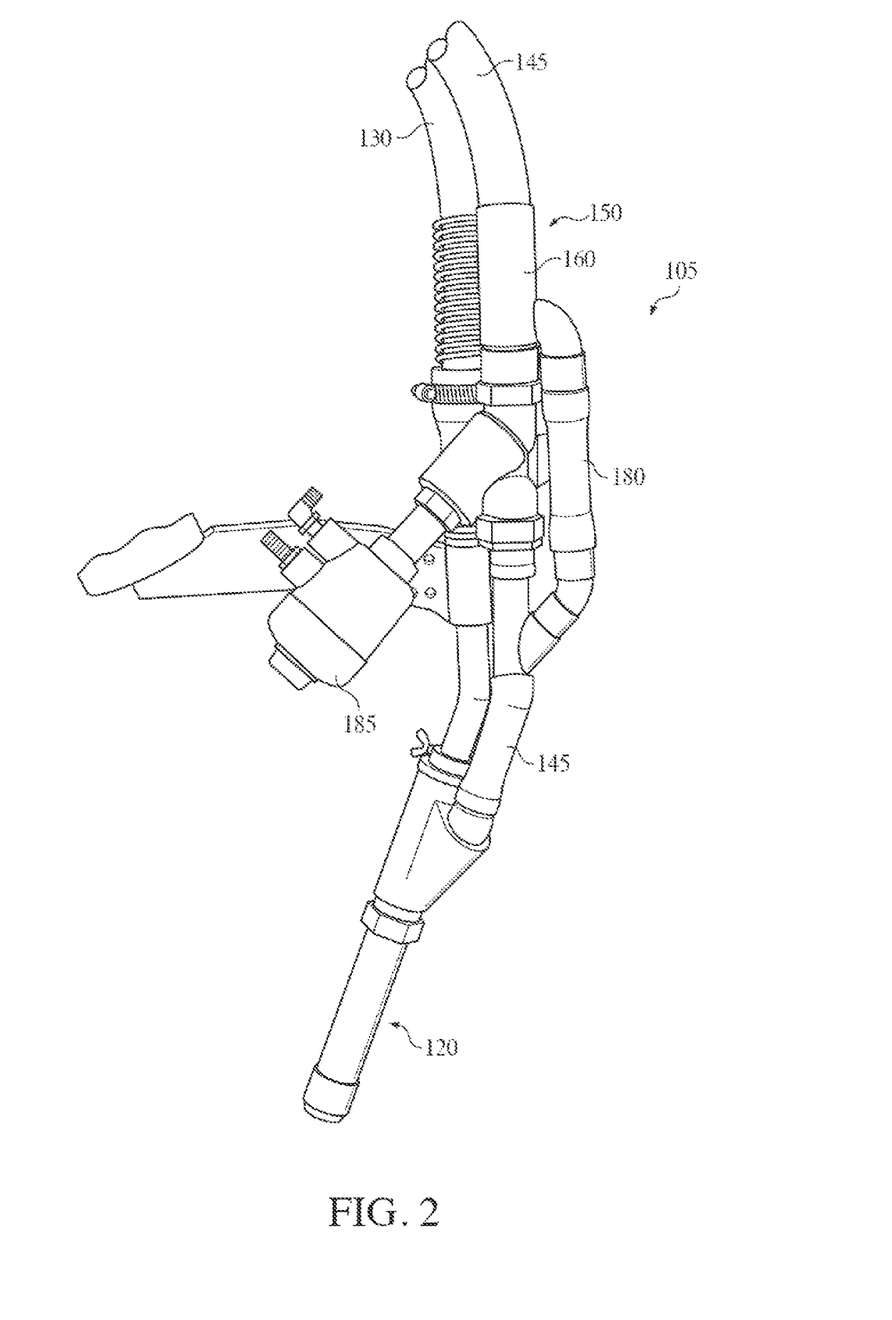
FIG. 2 is a side view of one embodiment of a welding torch of the submerged arc welding system shown in FIG. 1.
Figure 3:
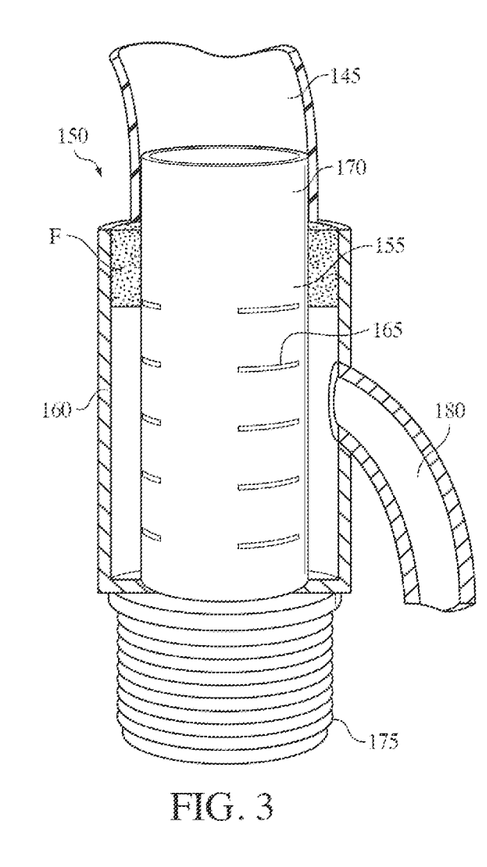
FIG. 3 is a partial cross-section of one embodiment of a vent chamber of a flux muffler for a welding torch of the submerged arc welding system.
Figure 4:
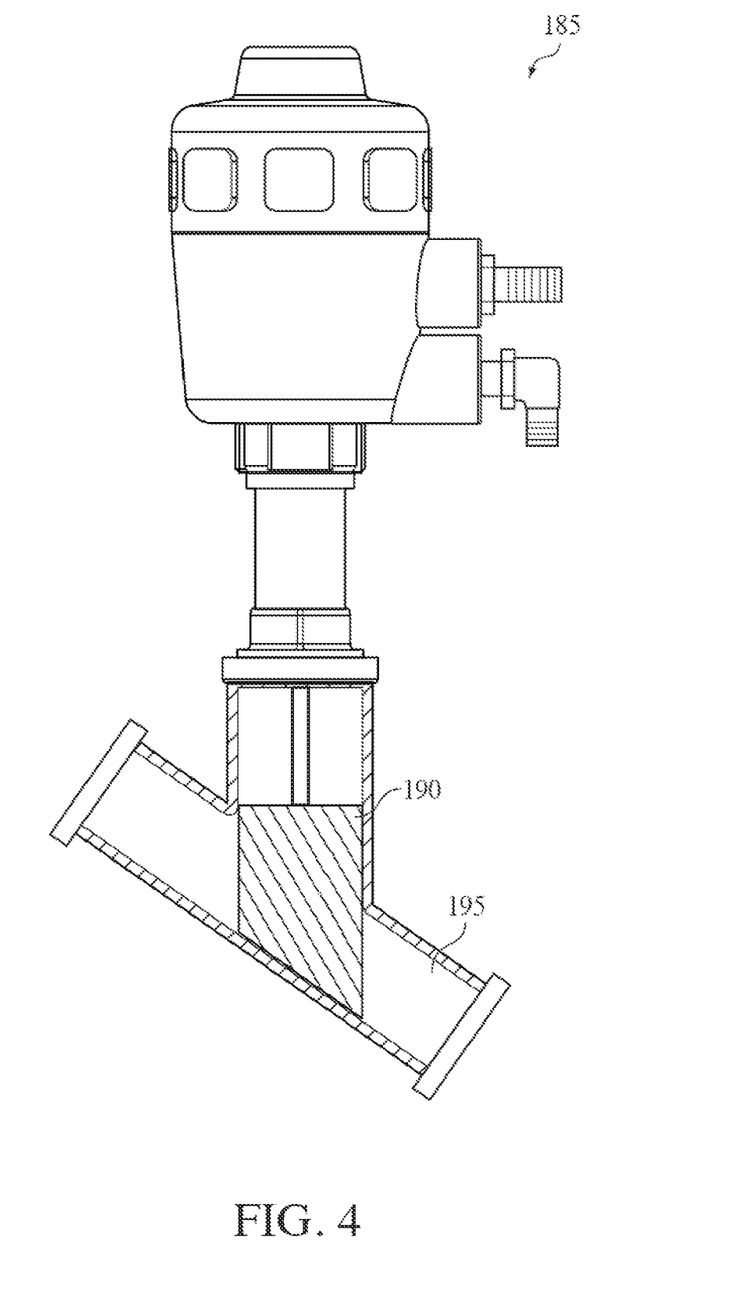
FIG. 4 is a partial cross-section of one embodiment of a valve for a welding torch of the submerged arc welding system.

Additional details of the welding torch 105 and other components of the submerged arc welding system 100 can be seen in FIGS. 2-4. FIG. 2 illustrates a side view of one embodiment of the welding torch 105. The welding torch 105 includes a flux muffler 150 disposed along the flux path and connected to the flux line 145. In the illustrated embodiment, the flux muffler 150 is adjacent to and connected with the welding torch 105. In an alternative embodiment, the flux muffler 150 is integral with the welding torch 105. In another alternative embodiment, the flux muffler 150 is spaced from the welding torch.

FIG. 3 illustrates a partial cross-section of the flux muffler 150. The flux muffler 150 includes a vent chamber 155 inside a casing 160. The vent chamber 155 has at least one vent 165 configured to remove pressurized air from the flux path. In the illustrated embodiment, the vent chamber 155 is a tubular conduit having an input 170, an output 175, and a plurality of elongated vents 165. In an alternative embodiment, the vent chamber may have a square, rectangular, or other geometric cross-section.

In the illustrated embodiment, the input 170 of the vent chamber 155 is smooth and has an outer diameter smaller than the inner diameter of the flux line 145, such that the input 170 may be inserted into the flux line 145. The flux line 145 may have elastic properties to maintain a connection with the vent chamber 155. In an alternative embodiment (not shown), the flux line 145 may be clamped onto the input 170 of the vent chamber 155. In other alternative embodiments, the input 170 of the vent chamber 155 may be threaded, or may have a snap-fit or other configuration to be connected to the flux line 145. In the illustrated embodiment, the output 175 of the vent chamber 155 is a threaded end, configured to be connected to a lower portion of the flux line 145. In alternative embodiments (not shown), the output 175 of the vent chamber 155 may be a smooth end, a snap-fit connector, or other known connector.

The vents 165 of the vent chamber 155 may be dimensioned to allow air to pass through without allowing flux particles to pass through. In the illustrated embodiment, the casing 160 surrounds the vent chamber 155 and is configured to capture any flux fines, dust, or other flux particles that pass through the vents 165 of the vent chamber 155. The casing 160 is open at the top to allow air to escape to the environment and includes a filter F to capture flux fines and dust, preventing them from passing through the open top. Exemplary filters include steel wool, or other fibrous materials that will allow air movement but restricts the flux fines. In the illustrated embodiment, the filter F is only located in an upper portion of the casing 160. In an alternative embodiment (not shown), the filter F extends to the bottom of the casing 160. In another alternative embodiment (not shown), the casing 160 does not include a filter. In yet another alternative embodiment (not shown), the casing 160 is closed at the top.

As shown in both FIGS. 2 and 3, the casing 160 is connected to a secondary flux line 180 that forms a path for the escaped flux fines, dust, and other flux particles. This path may be referred to as a flux fines path, a flux return path, or a flux recycling path.

In the illustrated embodiment, the secondary flux line 180 is reconnected to the flux line 145 below the flux muffler 150 and above the nozzle 120. In this manner, the escaped flux fines, dust, and other flux particles are recycled and rejoin the other flux particles. This process may be referred to as recycling, even though it occurs before the flux passes through the nozzle 120. The flux line 145 is connected to the nozzle 120 such that the flux and the recycled flux fines, dust, and other flux particles travel through the flux line 145 and pass through the nozzle 120. In one embodiment (not shown), the nozzle also includes vent to evacuate remaining air to the environment.

With continued reference to FIG. 2, a flux valve 185 is located along the flux line 145, and is configured to control the release of flux from the flux path to the nozzle 120 of the welding torch 105. In the illustrated embodiment, the flux valve 185 is directly below the flux muffler 150 and spaced from the nozzle 120 of the welding torch 105. In an alternative embodiment, the flux valve may be adjacent the nozzle 120 of the welding torch 105.

In one known embodiment, the flux valve 185 is a SPARTAN SCIENTIFIC SERIES APV-23 valve. In alternative embodiments, the flux valve 185 is a pinch, gate, or a butterfly style valves. In one embodiment, the flux valve 185 is normally biased in a closed position to prevent flux from accidentally being discharged through the nozzle 120.

FIG. 4 illustrates a partial cross-section of the flux valve 185. The flux valve 185 is substantially cylindrical and includes a piston 190 configured to extend into and seal a tube 195. The piston 190 is further configured to be retracted from the tube 195, thereby creating an opening along flux to pass through. The flux valve 185 may include a spring extended pneumatic operator to control extension or retraction of the piston 190.

Figure 5:
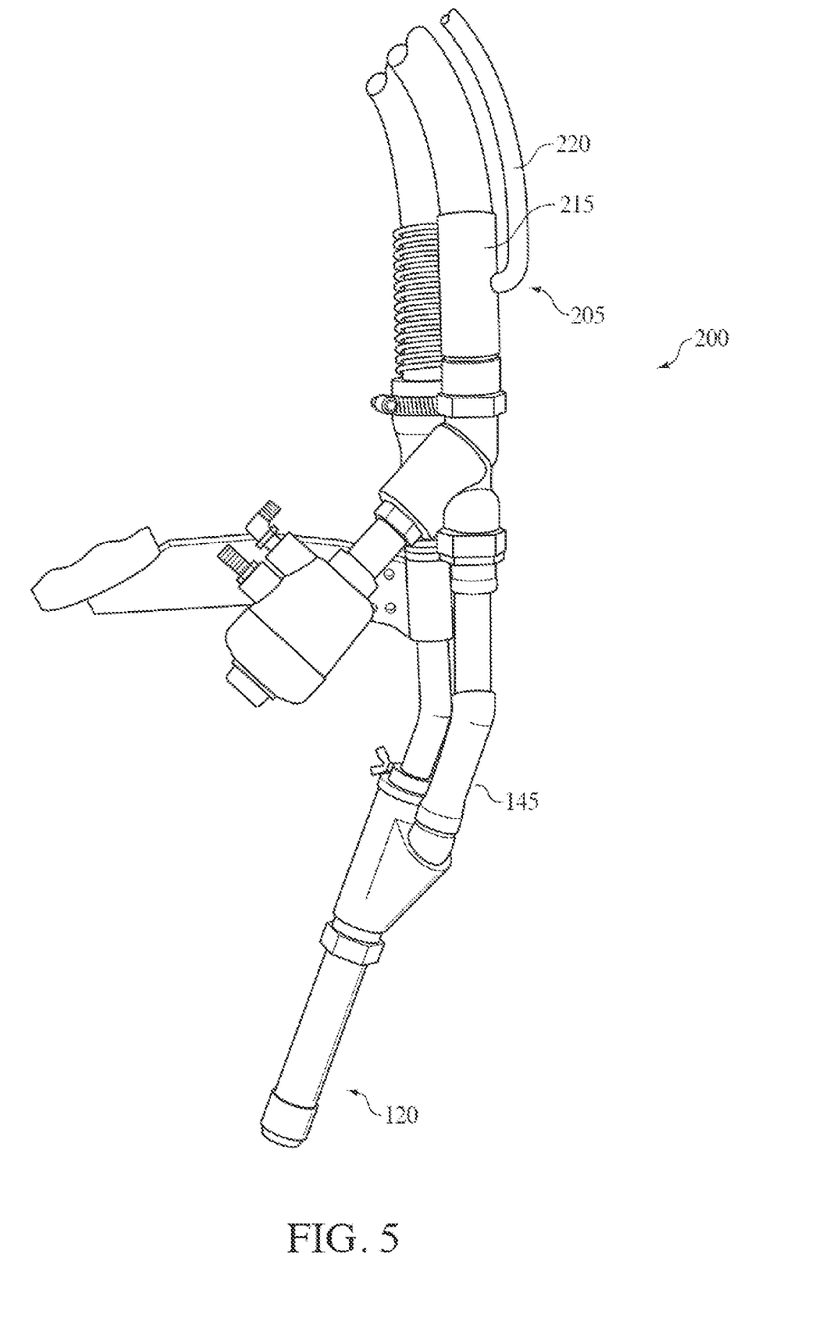
FIG. 5 is a side view of an alternative embodiment of a welding torch of the submerged arc welding system.

FIG. 5 illustrates a side view of an alternative embodiment of a welding torch 200 that is substantially the same as the welding torch 105 except for the differences described herein. The alternative welding torch 200 includes an alternative flux muffler 205.

Figure 6:
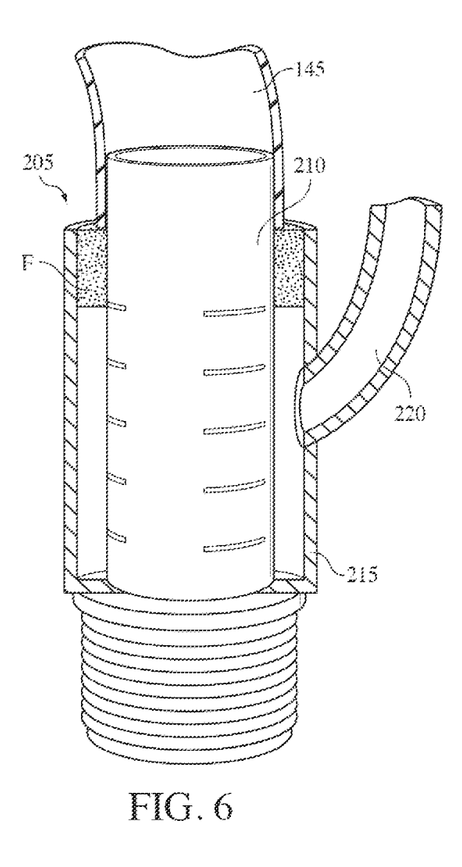
FIG. 6 is a partial cross-section of an alternative embodiment of a vent chamber of a flux muffler for a welding torch of the submerged arc welding system.

A partial cross-section of the alternative flux muffler 205 is illustrated in FIG. 6. The flux muffler 205 is substantially the same as the flux muffler 150, except for the differences described herein. The alternative flux muffler 205 includes a vent chamber 210 in a casing 215. However, the casing 215 is not connected to secondary flux line leading towards the nozzle of the welding torch. Instead, the casing 215 is connected to a vacuum tube 220 that leads away from the nozzle and forms a path for the escaped flux fines, dust, and other flux particles.

In one embodiment, the vacuum tube 220 is connected to the flux supply. In an alternative embodiment, the vacuum tube 220 is connected to the flux line. In both embodiments, escaped flux fines, dust, and other flux particles are reused. This process may be described as recycling, even though it occurs before the escaped flux fines, dust, and other flux particles are discharged through the nozzle.

In the illustrated embodiment, the casing 215 is open at the top and includes an internal filter F to capture flux fines and dust, preventing them from passing through the vents. Exemplary filters include steel wool, or other fibrous materials that will allow air movement but restricts the flux fines. In the illustrated embodiment, the filter F is only located in an upper portion of the casing 215. In an alternative embodiment (not shown), the filter F extends to the bottom of the casing 215. In another alternative embodiment (not shown), the casing 215 does not include a filter. In yet another alternative embodiment (not shown), the casing 215 is closed at the top.

Figure 7:
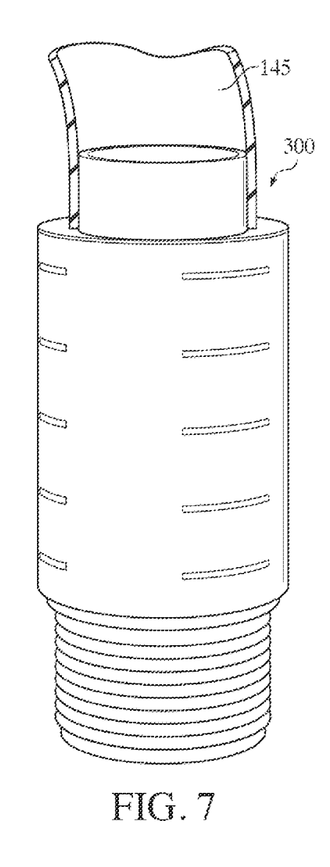
FIG. 7 is a partial cross-section of another alternative embodiment of a vent chamber of a flux muffler for a welding torch of the submerged arc welding system.

FIG. 7 illustrates another alternative embodiment of a flux muffler 300. In this embodiment, the flux muffler 300 is substantially the same as the flux muffler 150 and the alternative flux muffler 205, except the flux muffler 300 includes a casing 305 having a plurality of vents 310. The flux muffler 300 does not include a secondary flux line or a vacuum tube. Instead pressurized air is simply evacuated through the vents to the environment.

In the illustrated embodiment, a vent chamber 315 inside the casing also has a plurality of vents (not shown). In one embodiment, the flux muffler 300 further includes an internal filter disposed between the vent chamber 315 and the casing 305 to capture flux fines and dust, preventing them from passing into the environment. Exemplary filters include steel wool, or other fibrous materials that will allow air movement but restricts the flux fines.

Figure 8:
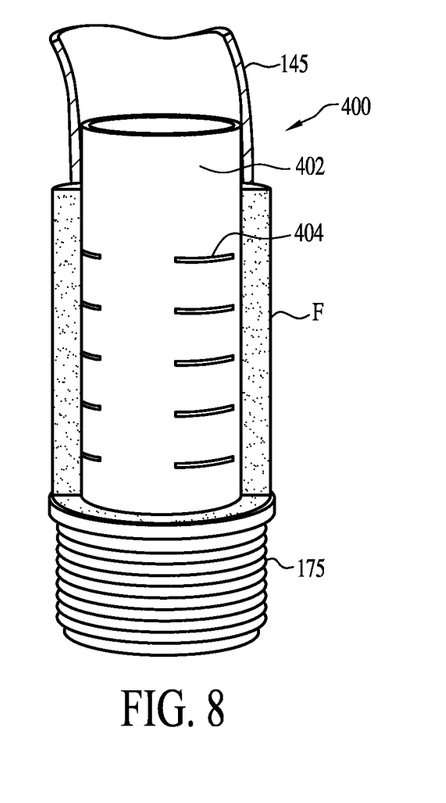
FIG. 8 is a partial cross-section of an example flux muffler.
Figure 9:
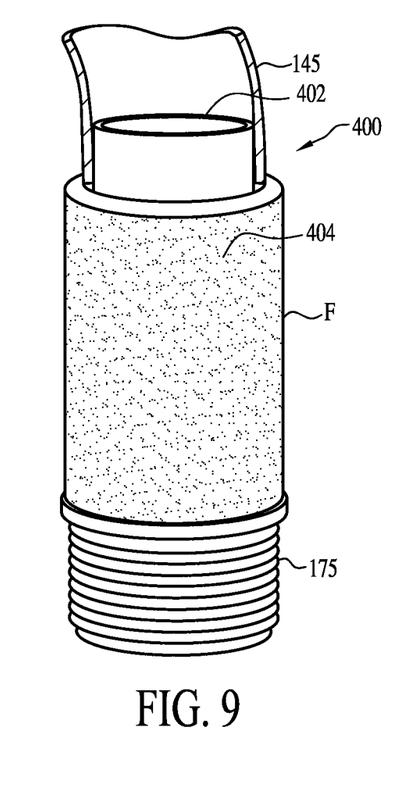
FIG. 9 is a perspective of an example flux muffler.
Figure 10:
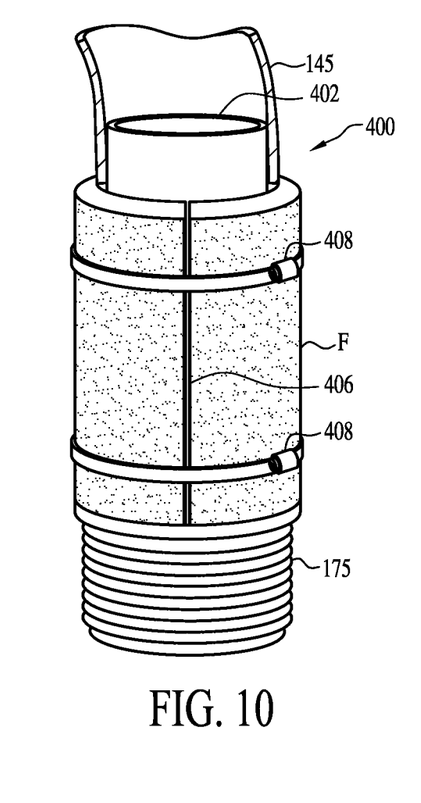
FIG. 10 is a perspective of an example flux muffler.

FIGS. 8-10 shows a flux muffler 400 having a filter F but no casing. The filter F surrounds the vent chamber 402 and the vents 404 in the vent chamber. The filter F captures flux fines and dust that passes through the vents 404 so that they are not discharged into the environment near the submerged arc welding system. Pressurized air from the flux path, and any entrained flux fines, can pass through the vents 404 in the vent chamber 402. The pressurized air that is evacuated from the flux path will also pass through the filter F, but the entrained flux fines will be captured by the filter.

The filter F can be in the form of a tubular sock that is slid over the vent chamber 402, as shown in FIG. 9. To install the filter F on the vent chamber 402, the flux line 145 can be detached from the flux muffler 400 and the tubular sock slid downward over the input side of the flux muffler to cover the vents. Alternatively, as shown in FIG. 10, the filter F can be in the form of a generally rectangular mat that is wrapped around the vent chamber so as to form a seam 406 along the filter. The filter F can be secured in place by clamps 408 such as hose or spring clamps for example. Alternatively, the filter F can include its own fastener(s) to secure it in place, such as hook and pile type fasteners, a zipper, snaps or buttons, etc.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A submerged arc welding system for use with a robot having at least a base, a first arm rotatably connected to the base, and a second arm rotatably connected to the first arm, the submerged arc welding system comprising:
    a welding torch having a nozzle, wherein the welding torch is connected to an end of the second arm of the robot;
    a wire supply configured to be located distal from the robot;
    a wire path connecting the wire supply to the nozzle of the welding torch;
    a wire motor configured to move wire from the wire supply along the wire path to the welding torch, the wire motor being mounted to the robot;
    a flux supply including a pressurized flux delivery system, the pressurized flux delivery system configured to move flux from the flux supply, along the flux path, to the welding torch;
    a flux path connecting the flux supply to the nozzle of the welding torch;
    a flux muffler disposed along the flux path and connected to the welding torch, wherein the flux muffler forms at least one vent that vents air from the pressurized flux delivery system and the flux muffler comprises a filter surrounding the at least one vent, wherein the air vented through the at least one vent is evacuated from the flux path through the at least one vent and through the filter; and
    a valve disposed along the flux path between the flux muffler and the nozzle of the welding torch, wherein the valve is configured to control a release of flux from the pressurized flux delivery system to the nozzle,
    wherein the flux muffler includes a threaded output portion.

2. The submerged arc welding system of claim 1, wherein the valve is normally biased in a closed position.

3. The submerged arc welding system of claim 1, wherein the torch is a submerged arc welding torch weighing less than 20 kg.

4. The submerged arc welding system of claim 1, wherein the flux supply is located distal from the robot.

5. The submerged arc welding system of claim 4, wherein the flux path does not include a gravity hopper.

6. The submerged arc welding system of claim 1, wherein the filter comprises a fibrous material configured to capture flux fines from the flux path.

7. The submerged arc welding system of claim 6, wherein the flux muffler comprises a casing surrounding the filter.

8. A submerged arc welding system for use with a robot having at least a base, a first arm rotatably connected to the base, and a second arm rotatably connected to the first arm, the submerged arc welding system comprising:
   a welding torch having a nozzle, wherein the welding torch is connected to an end of the second arm of the robot;
   a wire supply configured to be located distal from the robot;
   a wire path connecting the wire supply to the nozzle of the welding torch;
   a wire motor configured to move wire from the wire supply along the wire path to the welding torch, the wire motor being mounted to the robot;
   a flux supply including a pressurized flux delivery system, the pressurized flux delivery system configured to move flux from the flux supply, along the flux path, to the welding torch;
   a flux path connecting the flux supply to the nozzle of the welding torch;
   a flux muffler disposed along the flux path and connected to the welding torch, wherein the flux muffler comprises a vent chamber forming at least one vent that vents air from pressurized flux delivery system and the flux muffler comprises a filter surrounding the vent chamber, wherein the air vented through the at least one vent is evacuated from the flux path through the at least one vent and through the filter surrounding the vent chamber; and
   a valve disposed along the flux path between the flux muffler and the nozzle of the welding torch, wherein the valve is configured to control a release of flux from the pressurized flux delivery system to the nozzle,
   wherein the flux muffler includes a threaded output portion.

9. The submerged arc welding system of claim 8, wherein the valve is normally biased in a closed position.

10. The submerged arc welding system of claim 8, wherein the torch is a submerged arc welding torch weighing less than 20 kg.

11. The submerged arc welding system of claim 8, wherein the flux supply is located distal from the robot.

12. The submerged arc welding system of claim 11, wherein the flux path does not include a gravity hopper.

13. The submerged arc welding system of claim 8, wherein the filter comprises a fibrous material configured to capture flux fines from the flux path.

14. The submerged arc welding system of claim 13, wherein the flux muffler comprises a casing surrounding the filter and the vent chamber.

* * * * *